Feb. 10, 1959  A. N. STANTON  2,872,840
PRESENTATION DEVICES FOR VISUAL INFORMATION
Filed Dec. 23, 1953
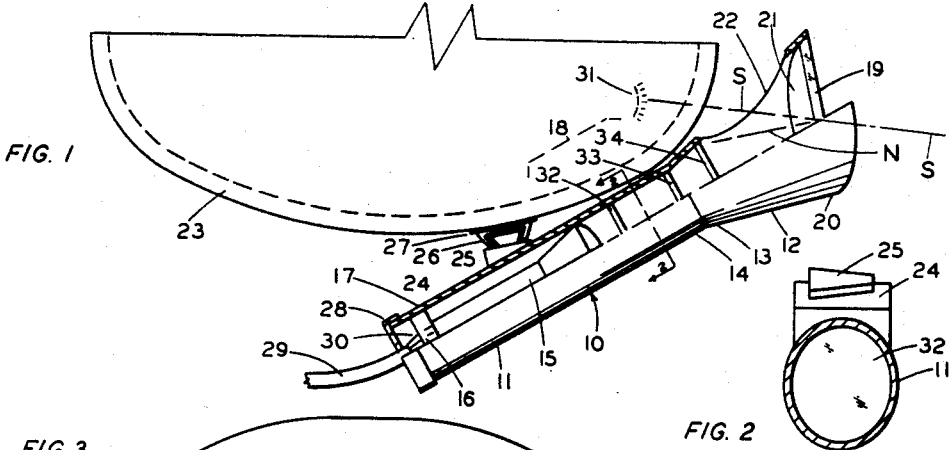
FIG. 1
FIG. 2
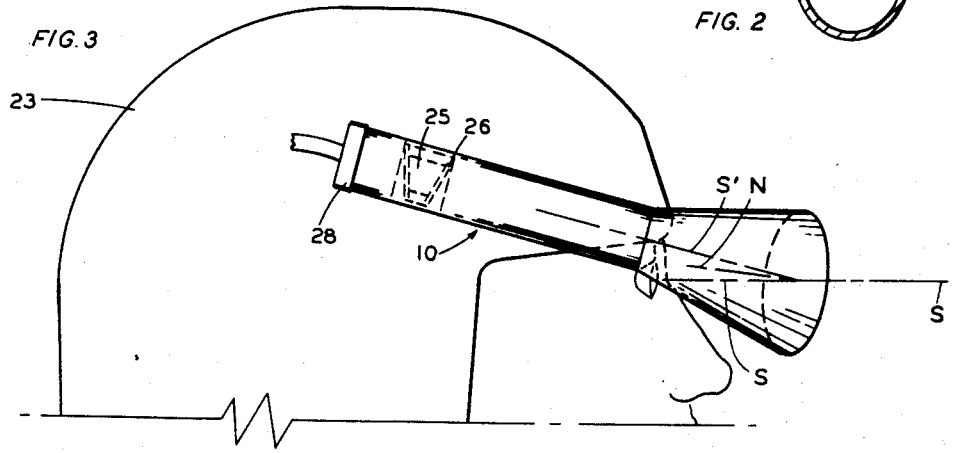
FIG. 3
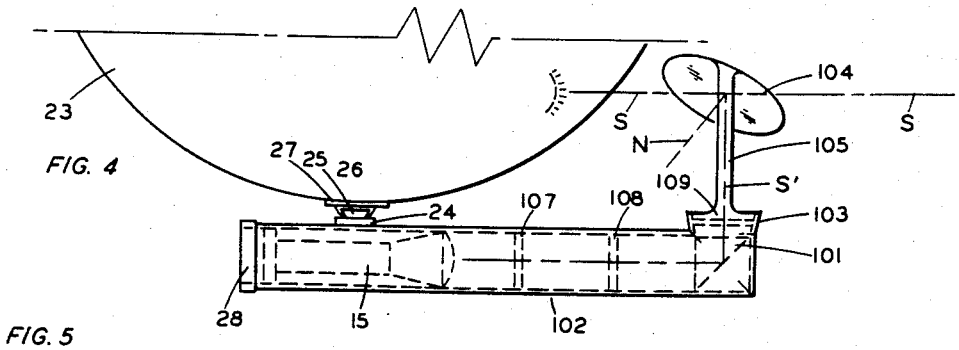
FIG. 4
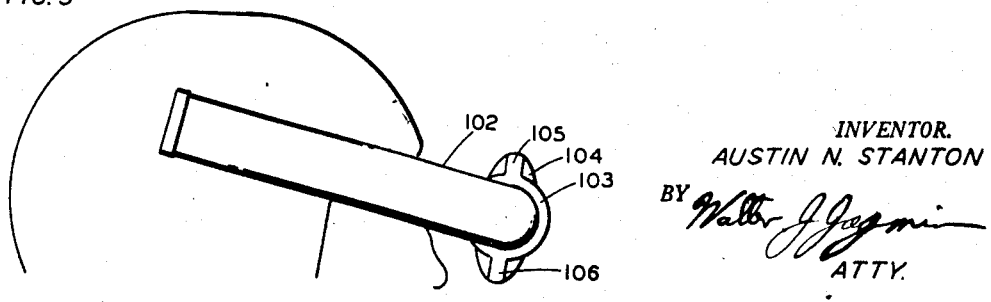
FIG. 5
INVENTOR.
AUSTIN N. STANTON
BY Walter J. Jasmin
ATTY.

United States Patent Office 2,872,840
Patented Feb. 10, 1959

2,872,840
PRESENTATION DEVICES FOR VISUAL INFORMATION

Austin N. Stanton, Garland, Tex.

Application December 23, 1953, Serial No. 399,908

1 Claim. (Cl. 88—1)

This invention relates to a new and novel visual presentation device, and more particularly to a device for superposing visual information from a remote or invisible source upon a focal plane in a separate field of vision.

There has long been a need for an arrangement for introducing an image of visual information from a remote or invisible source on a focal plane within the field of vision of a person's eye, a camera, or other visual sensing means to give the effect of a composite picture similar to that attained in television and motion picture presentations.

Obviously such an arrangement would have innumerable applications in such fields as military or commercial aviation; the operation of land or sea craft; and any assembly or control operations demanding visual reference to more than a single field of vision, or the simultaneous discernment of visual and oral or other type information. While the description of my invention is limited to the field of aviation and particularly to the military aspects thereof it is to be understood that my invention can be used with equal facility in the remaining fields set forth above.

The operating personnel of modern aircraft, particularly military aircraft, are confronted with almost overwhelming demands upon their mental and physical faculties due to the swiftness in which visual and oral control information must be assimilated and obeyed in the extremely short response periods afforded by the extremely fast flying speeds now encountered. For example, before a pilot actuates the controls to alter the altitude of his airplane he must first coordinate with the visual picture he sees from his cockpit position, various control data from the instrument panel, and also in most cases verbal information from his radio or other personnel in the airplane. Even at relatively low speeds the pilot is frequently presented with situations that require repeated changes in eye focus and line of sight to fully comprehend the visual aspects of a particular situation. In the case of the military pilot there is the further complication of simultaneously aiming and firing his guns or bombs at enemy targets. Obviously the stress on a pilot in either situation described above increases as his response time is shortened by increased aircraft speeds. With the present trend toward faster flight speeds and the increase in duties assigned to the pilot, it is apparent that we are fast approaching the limit of a pilot's capabilities.

It is the purpose of this invention to provide an optical device to be worn by a person, though not limited to that use, for superposing visual information from remote or invisible sources in the form of an image thereof appearing to emanate from a plane in the person's field of vision without altering his range of vision. Basically the device of this invention consists of a transparent reflector plate, cathode ray tube or other planar source of visual information, and a focusing and magnifying optical lens system. The display surface of the cathode ray tube or other source of visual information is disposed in fixed relation to the transparent reflector plate. The optical lens system is disposed between the source of visual information with the optical axis thereof forming an oblique angle with the reflective surface of the transparent plate. The device is adapted to be worn by a viewer in fixed relation to his eye with the transparent reflector plate positioned adjacent the eye and across his normal cone of vision. The reflective surface of the plate is oriented with respect to the viewer's eye and the optical axis of the lens system, along which the visual information from the face of the cathode ray tube or equivalent source is projected, in such a manner as to reflect the line of sight from the viewer's eye along said optical axis to the face of the cathode ray tube. The lens system and the cathode ray tube or equivalent source are positioned beside the viewer's head but outside of said cone of vision. With this arrangement the viewing eye comprehends directly the visual scene lying on the other side of the transparent plate and reflectively the visual information appearing on the tube face. The visual information from the tube face is seen as a virtual image which appears to emanate from a focal plane within said cone of vision. The lens system both magnifies the visual information appearing on the face of the tube and focuses the virtual image thereof on a plane which by means of the reflective surface of the transparent plate appears to the viewing eye as coinciding with the focal plane in the eye's cone of vision upon which the eye is focussed. Thus it can be seen that an optical system can be selected to meet relatively short eye focal lengths such as encountered in short visual focal planes associated with bench work or the like, or may be selected to present the virtual image in a plane appearing to lie at the plane of infinite focus which as is well known normally lies about twenty feet from the average eye. Within this twenty foot range the optical system should be selected to present the virtual image in a plane appearing to lie very close to the directly viewed planes to minimize the necessity of eye accommodation which would result if the eye had to focus first on one plane and then another. If, however, the normal directly viewed image or scene lies at or beyond this twenty foot range no eye accommodation would be required if the optical system presents the virtual image in a plane appearing to lie at the twenty foot plane since all light rays entering the eye from or beyond this distance are detected by the eye as parallel rays.

Accordingly, it is an object of this invention to provide a device for superposing an image of visual information from a remote or invisible source upon a plane appearing to lie in a separate field of vision.

It is another object of this invention to provide a reflective transparent plate arrangement enabling viewing means to simultaneously view objects in the field of vision observed through the plate and reflections of objects in another field of vision from the reflective portion of the plate.

It is another object of this invention to provide an optical device for superposing visual information from a remote or invisible source in the form of an image on a focal plane appearing to lie in the normal field of vision of a viewing means which is maintained in fixed relation to the viewing means.

It is another object of this invention to provide a device for presenting to a focal surface with the field of vision of a viewing means such as a person's eye, camera, or other optical means simultaneously a directly viewed focal zone within its normal field of vision and a visual presentation of initially visual or invisible information which appears to the viewing means as being in said field of vision and in focus with said focal zone.

It is another object of this invention to provide a visual presentation maintained in fixed relation to a person's head for combining visual information from a source external to the person's normal field of vision with the visual scene within the person's normal field of vision.

These objects and others which will become apparent from the following description of the invention taken in conjunction with the drawings in which:

Figure 1 is a partial sectional view of one form of the presentation device as seen from above a viewer's head;

Figure 2 is a sectional view taken along II—II of the presentation device shown in Figure 1;

Figure 3 is a side view of Figure 1;

Figure 4 is a partial sectional view of another form of the presentation device as seen from above a viewer's head; and, Figure 5 is a side view of Figure 4.

The embodiment of the presentation device of this invention shown in Figures 1, 2 and 3 basically consists of a housing 10 formed of a sleeve-like section 11 of uniform cross section throughout its length and an open ended flared section 12 coaxially joined at the small end 13 thereof to end 14 of section 11. A cathode ray picture tube 15 and a tube socket 16 are secured in fixed coaxial relation within section 11 adjacent end 17 with the display screen of the tube facing toward the flared section 12. The individual lenses of optical system 18 are securely positioned in the remaining portion of housing 10 in spaced relation with their optical axes coincident with the common axis of sections 11 and 12. A transparent reflective plate 19 is disposed in the large end 20 of flared section 11. The end 20 of section 12 is so formed that the normal N to the plane in which its face lies, hence the reflective surface 21 of plate 19, bisects the angle subtended by the optical axis S' and the viewer's line of sight S through the opening 22. The device is secured to a pilot's crash helmet 23 or cap by means of a keystone type fastener comprising the boss 24 which is suitably secured by a weld, cement, or other fastening means to the section 11, a keystone wedge 25 affixed to the boss and complimentary keystone slot 26 affixed to plate 27 which is secured to the helmet 23. The end 17 of housing section 11 is closed by a cap member 28 which is centrally apertured for the passage of the multi-conductor cable 29 leading from the various socket terminals 30. The optical system 18 comprises a series of lens 32, 33 and 34 for magnifying and focusing the visual information appearing on the face of tube 15 with respect to the eyepoint 31. The specific physical characteristics of these lenses may be selected to meet the individual user's optical needs. The specific physical characteristics of these lenses, which vary with individual applications of the device, are readily determined by well known optical techniques. The basic lens requirements are that each lens 32, 33, and 34, successively, enlarge the image appearing on the tube face and that their focal lengths be greater than the distance from their central planes and the image, real or virtual, being projected, whereby the image on the face of tube 15 appears to be at the desired focal length with respect to the viewer's eye.

The housing sections 11 and 12 are made of aluminum or any rigid lightweight plastic. The interior walls of these sections are coated with a suitable light absorbing black finish to minimize detrimental glare from extraneous light entering through plate 19 or opening 22. While the cross-section of the housing, hence that of the picture tube, lenses and plate 19, are shown as elliptical it is obvious that any desired cross-sectional shape can be given these parts.

From the above description of the embodiment shown in Figures 1, 2, and 3, it is readily seen that any visual information such as an aircraft instrument panel or other source of pertinent visual information can be displayed on the screen of picture tube 15 through the multi-conductor cable 29 by conventional cathode ray techniques. The visual information thus displayed on the screen of tube 15 is then optically enlarged and projected as a virtual image appearing to the viewer's eye as emanating from a focal plane at infinite eye focus. This virtual image is reflectively detected at the eye point 31 of the viewer along his normal line of sight through the transparent reflective plate 19, such as the representative line of sight designated as S in Figures 1 and 2. This virtual image then appears to the viewing pilot as being superposed on a focal plane in his normal field of vision through plate 19. Since a pilot's eye is normally focused at infinity both the image of the tube screen and the visual scene lying in his normal visual field of the viewing pilot will be in focus.

The modification shown in Figures 4 and 5 differs from that shown in Figures 1, 2 and 3 only in slight structural changes necessary to accommodate the additional reflector prism 101. The housing section 102 is joined at a right angle to the short housing section 103. The transparent reflective plate 104 is secured to the end of section 103 by means of bracket arms 105 and 106 integral with housing section 103. Lens 107 and 108 are positioned in section 102 and lens 109 is positioned in section 103. These lenses together with prism 101 constitute a system equivalent to the lens system 18 of Figure 1. As is clearly shown in Figure 4 the light rays from the tube screen are reflected 180°, 90° at each of the reflectors 101 and 104, to effect presentation of images of any visual information on the tube screen to the eye point of the viewer in coincidence with his normal line of vision through the plate 104 in the manner described in conjunction with Figures 1, 2 and 3.

It is apparent that each modification of the presentation device disclosed can be mounted on either side of the viewer's head or interemediate each side position with proper adjustment of the reflectors to bring the reflected and the viewer's normal field of vision through the plates 19 or 104 into coincidence. This disclosure also comprehends the use of presentation devices on both eyes at the same time whether required by lighting conditions or type of visual information being presented. It is obvious that image reversals can be effected by conventional electrical reversal of the visual information presented on the tube face or by the inclusion of a reversing lens in the lens system.

The foregoing description of the principle of this invention and certain modes of its application is to be construed as illustrative only, other changes in the shape, size and arrangements of parts may be employed without departure from the true scope of the invention as further defined in the appended claim.

I claim:

A presentation device for use as a visual information aid which is conjunctive to the normal visual perception of a viewer comprising: a viewer's headpiece adapted to be secured to a viewer's head and having forehead portions and side portions for engaging the viewer's head when the device is in position for use; an elongated tubular housing mounted on said headpiece portions at an oblique angle to the line of vision of the viewer, said housing being flared at the forward end, said flared portion being opposite the eye of the viewer; a small cathode ray tube which is adapted for receiving and displaying visual information received from a remote source disposed in said housing at one end thereof remote from said flared end; a semi-transparent, semi-reflecting lens mounted in said flared portions, said flared portion having a viewing aperture in line with the lens, said lens reflecting light from the small cathode ray tube to the eye of the viewer and transmitting light from the normal field of view to the eye of the viewer; an optical lens means disposed in said housing between said cathode ray tube and said semi-transparent, semi-reflecting lens to project the visual information from said cathode ray tube to said semi-transparent, semi-reflecting lens whereby the said visual information is continuously superposed in the normal field of vision of the viewer at an infinite focus.

References Cited in the file of this patent

UNITED STATES PATENTS

| | | |
|---|---|---|
| 1,688,113 | Bomkessel | Oct. 16, 1928 |
| 2,352,644 | Linderman et al. | July 4, 1944 |
| 2,360,768 | French | Oct. 17, 1944 |
| 2,382,631 | Harasta | Aug. 14, 1945 |
| 2,388,170 | McCollum | Oct. 30, 1945 |
| 2,426,184 | Deloraine et al. | Aug. 26, 1947 |
| 2,462,468 | Clark et al. | Feb. 22, 1949 |